Nov. 24, 1942.   L. B. NEIGHBOUR ET AL   2,302,879
MANURE SPREADER DRIVE MECHANISM
Filed Nov. 4, 1940   4 Sheets-Sheet 1
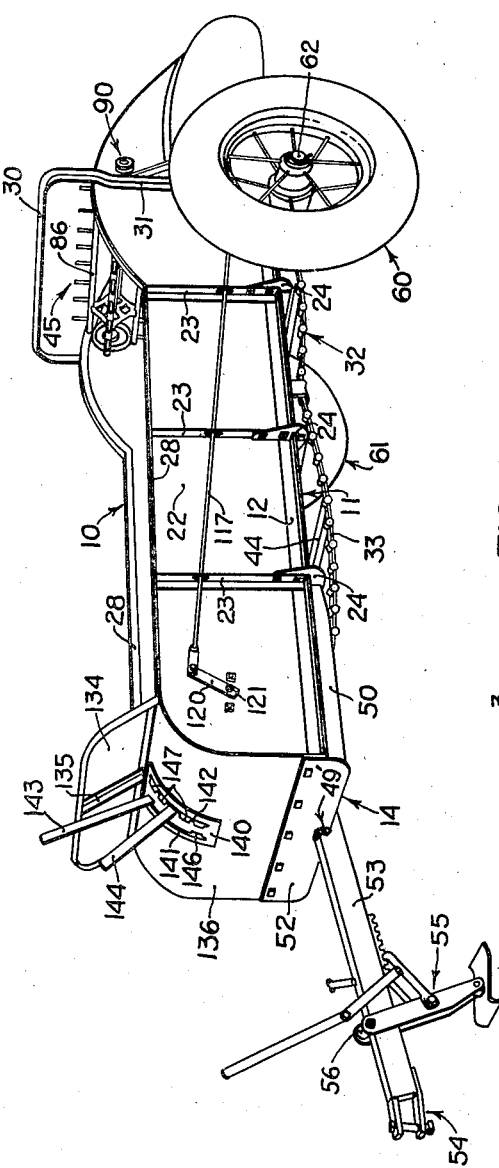
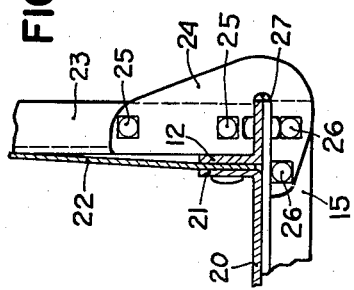
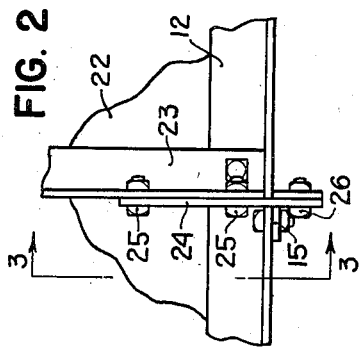
INVENTORS
LEONARD B. NEIGHBOUR, FREDERICK A. THOMANN
BY
ATTORNEYS.

Nov. 24, 1942.  L. B. NEIGHBOUR ET AL  2,302,879
MANURE SPREADER DRIVE MECHANISM
Filed Nov. 4, 1940  4 Sheets-Sheet 2
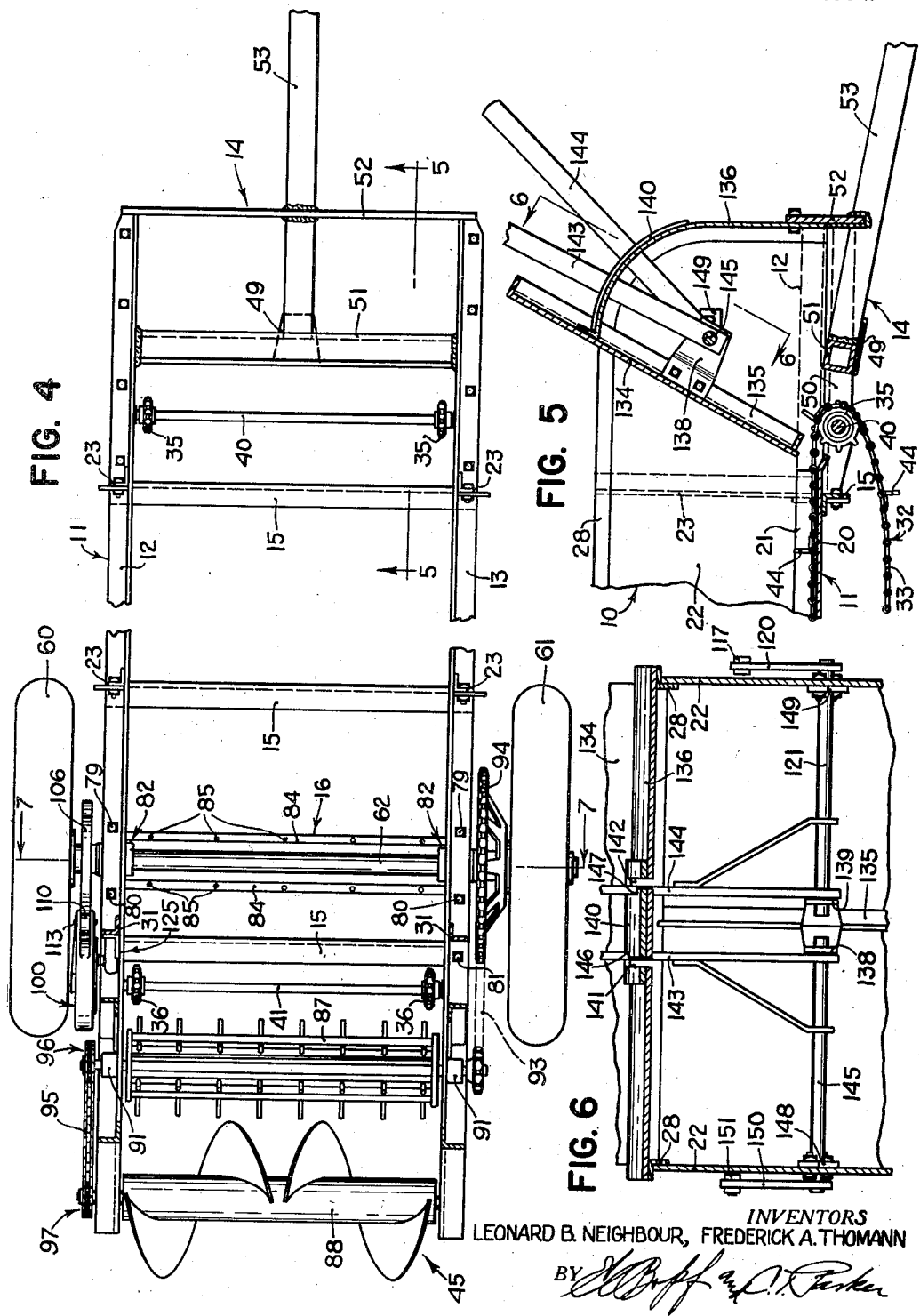
INVENTORS
LEONARD B. NEIGHBOUR, FREDERICK A. THOMANN
ATTORNEYS.

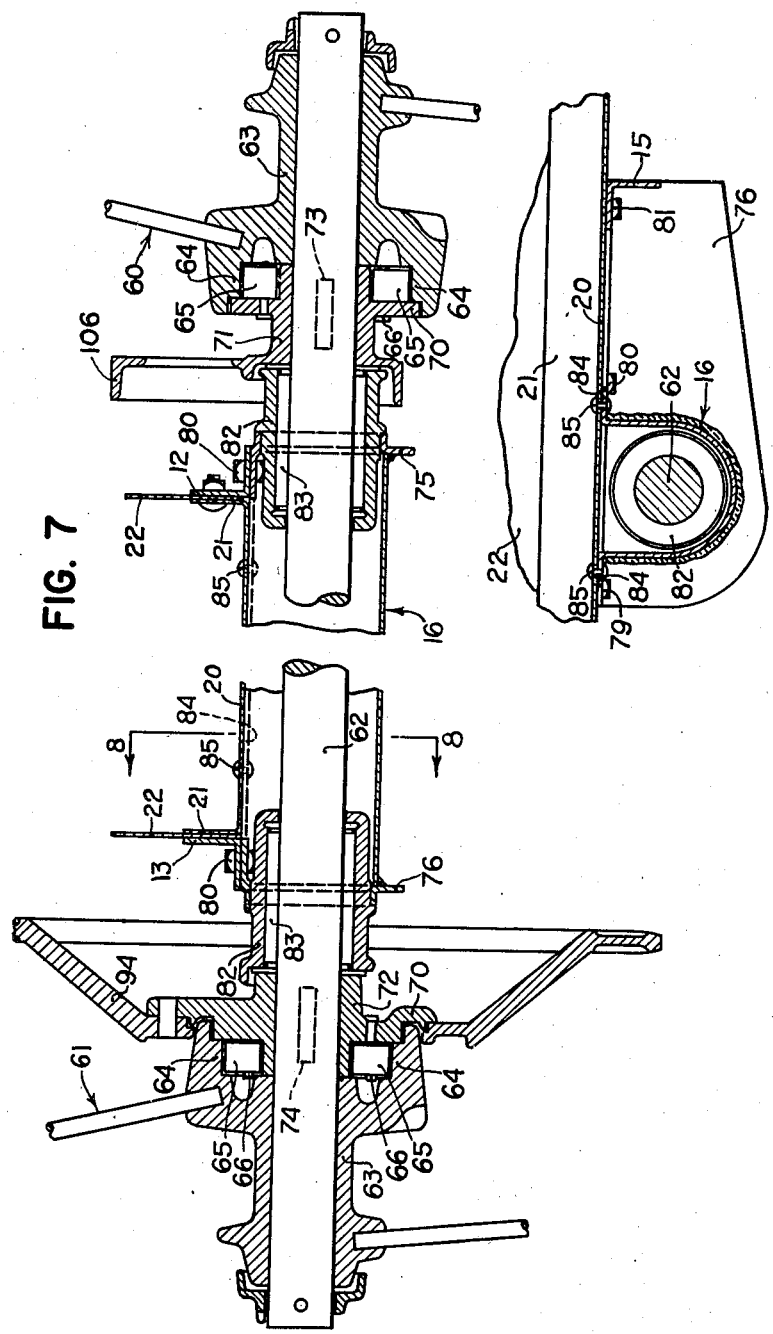

Nov. 24, 1942.  L. B. NEIGHBOUR ET AL  2,302,879
MANURE SPREADER DRIVE MECHANISM
Filed Nov. 4, 1940  4 Sheets-Sheet 4
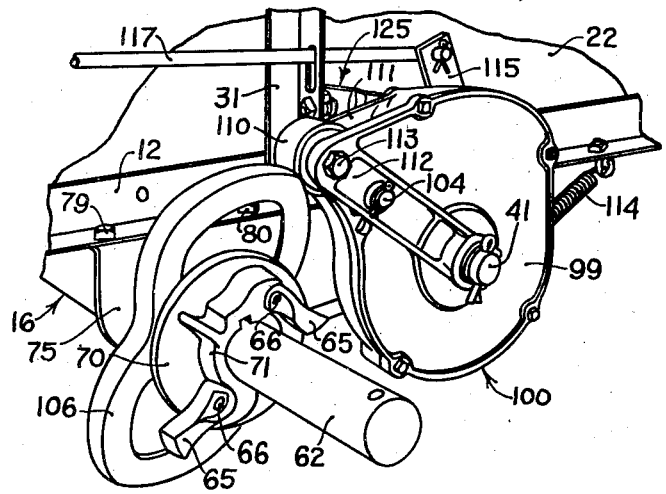
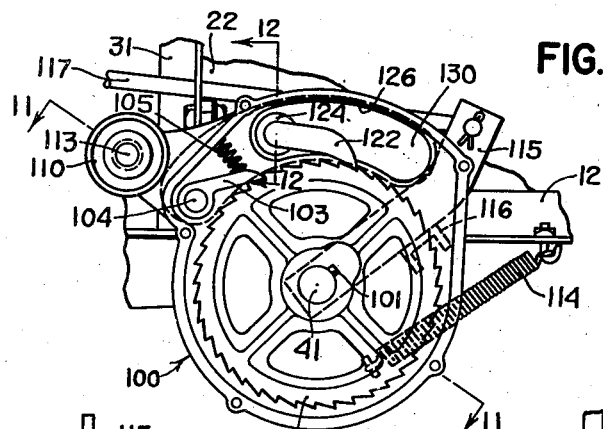
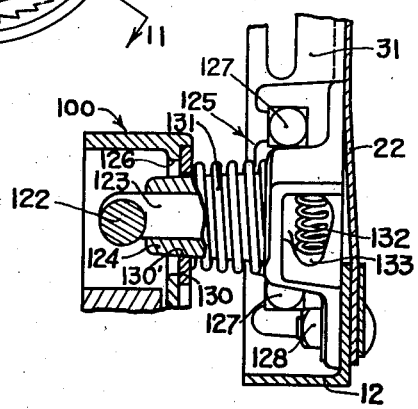
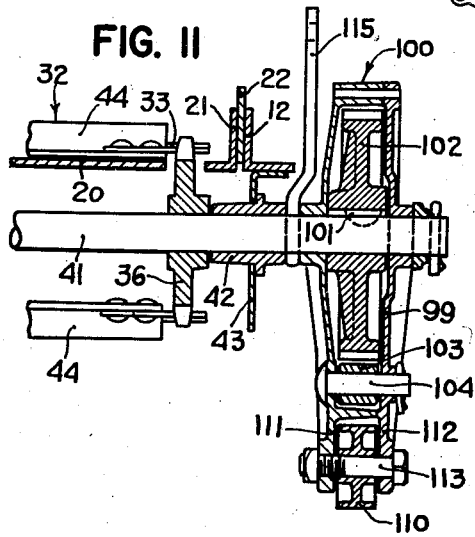
INVENTORS
LEONARD B. NEIGHBOUR, FREDERICK A. THOMANN
ATTORNEYS.

Patented Nov. 24, 1942

2,302,879

UNITED STATES PATENT OFFICE 2,302,879

MANURE SPREADER DRIVE MECHANISM

Leonard B. Neighbour, Moline, and Frederick A. Thomann, East Moline, Ill., assignors to Deere & Company, Moline, Ill., a corporation of Illinois Application November 4, 1940, Serial No. 364,196

7 Claims. (Cl. 74—125)

The present invention relates to two-wheeled tractor-drawn implements, and more particularly to a tractor-drawn manure spreader of the type comprising a body supported at the rear end on a pair of laterally spaced wheels and at the front end on the tractor drawbar.

The principal object of this invention is to provide an improved two-wheeled manure spreader that is exceedingly stiff and rigid against lateral twisting or weaving when the spreader is unevenly loaded or when it is driven over rough ground, but which is light in weight and economical to manufacture. In the furtherance of this object, we have provided a transverse torque member fixed to the body adjacent the rear end thereof and a rigidly braced hitch frame fixed to the front end of the body, which cooperate to produce a vehicle structure of great strength and rigidity. Additional stiffness is provided by a transversely extending curved sheet, or hood, fixed to the front end of the body adjacent the hitch frame, which is also slotted and notched to serve as a locking sector for certain adjusting levers disposed beneath the hood.

Another of the important features of our invention pertains to the mechanism for producing the intermittent travel of the conveyor which feeds the load gradually rearwardly toward the beating and distributing mechanism, and in this regard, it is another of the objects of the invention to provide a construction wherein the ratchet wheel, ratchet pawl, and holding dog are mounted within a housing and are protected from manure and dirt. This construction also allows the mechanism to operate in a bath of oil, which greatly prolongs the life of the mechanism and insures trouble free operation. In the carrying out of this object the housing in which the ratchet wheel and pawl are mounted, oscillates about the axis of the ratchet wheel to advance the same.

A further object is to provide improved means for rigidly bracing the sides of the body against spreading when heavily loaded.

Another feature of our invention consists in mounting the axle bearings in the ends of the transverse torque member, with the live axle extending through the torque member whereby the axle is located at the point of maximum stiffness and is relieved of bending stresses.

These and other objects and advantages of the present invention will become apparent to those skilled in the art after consideration of the following detailed description of the preferred embodiment thereof, reference being had to the accompanying drawings, in which Figure 1 is a perspective view of a two-wheeled manure spreader constructed according to the principles of our invention;

Figure 2 is an enlarged detail view of one of the braces holding the sides of the manure box in place;

Figure 3 is a sectional view, taken along the line 3—3 in Figure 2;

Figure 4 is a top plan view of the under frame structure supporting the manure box and spreading mechanism;

Figure 5 is a vertical section, taken through the manure box and frame substantially as indicated by the line 5—5 in Figure 4;

Figure 6 is a sectional view taken along the line 6—6 in Figure 5;

Figure 7 is an enlarged transverse vertical section through the rear axle and torque member, taken substantially along the line 7—7 in Figure 4;

Figure 8 is a section taken along the line 8—8 in Figure 7;

Figure 9 is a fragmentary perspective view showing the cam operated feeder mechanism;

Figure 10 is a side elevation of the ratchet escapement housing with the cover plate removed;

Figure 11 is a sectional view through the housing and ratchet escapement, taken along the line 11—11 in Figure 10; and Figure 12 is an enlarged sectional view through the holding dog support bearing and housing slot closure, taken substantially along the line 12—12 in Figure 10.

Referring now to the drawings, the manure spreader illustrated consists of a generally fore and aft extending body 10 supported on a frame structure 11 comprising a pair of laterally spaced, longitudinally extending angle iron members 12 and 13 which are joined together at their front ends by a hitch frame 14. Transversely disposed cross angle members 15 connect the frame members 12, 13 at longitudinally spaced intervals, and near their rear ends the frame members are connected by a transverse torque member 16, which will hereinafter be more fully described. A sheet metal bed, or flooring 20 rests upon and is fixed to the cross members 15 and has upwardly turned flanges 21 at the sides thereof which are fixed to the longitudinal frame members 12, 13.

The side walls of the spreader body are indicated by the reference numeral 22 and are preferably made of sheet metal which is fixed to vertical angle members 23. The upper edge and curved front end of the side walls are reenforced by light angles 28, one flange of which is fixed to the inner sides of the side walls and the other flange of which extends outwardly over the edge of the side walls. The vertical members 23 are fixed at their lower ends to the longitudinal frame members 12, 13, adjacent the ends of the cross members 15, and are connected with their respective cross members by braces 24. The braces 24 consist of plates which are adapted to be bolted at 25 to the transverse vertical flanges of the vertical angle members 23, and at 26 to the transverse vertical flanges of the cross members 15. The edges of the plates are slotted at 27 to receive the horizontal flanges of the longitudinal frame members 12, 13 and 15. This construction provides a brace of great strength for preventing the sides of the body from spreading, and at the same time eliminates the need for projecting the ends of the transverse members laterally outwardly beyond the side walls to secure a connection for the brace.

The sides of the body are tied together at the top by an angle iron member 30 formed in the shape of an inverted U, the extremities 31 thereof projecting down along the exterior of the side walls and being secured thereto. The arch portion of the member 30 extends far enough above the side walls of the body to permit a heaped-up load of material carried by the body to pass thereunder.

The material carried in the body is caused to travel gradually rearwardly therein, when the machine is in operation, by an endless belt conveyer or apron 32 of the type comprising a pair of laterally spaced endless chains 33 which are trained over sprocket wheels 35 and 36 mounted on front and rear shafts 40 and 41, respectively. The shafts 40, 41 are journaled in suitable bearings 42 (Figure 11) which are mounted in brackets 43 fixed to the under sides of the longitudinal frame members 12, 13. Transverse slats 44 of angle iron are fixed to the chains 33 at intervals, and scrape along the flooring 20 to carry the material rearwardly to rotary beating and distributing mechanism, indicated generally by the reference numeral 45, disposed at the rear of the spreader body. The conveyor is operated by mechanism that will be described in detail presently.

The front end of the body 10 is supported on the hitch frame 14 and is rigidly braced thereby against twisting about the longitudinal axis of the body. The hitch frame 14 consists of a pair of laterally spaced fore and aft extending angle members 50 which are fixedly secured to the under sides of the longitudinal frame members 12, 13 at the front ends thereof. The members 50 are connected together by a pair of fore and aft spaced, transversely extending beams 51 and 52 which are welded to the midpoints and front ends, respectively, of the members 50. Preferably, the beam 51 is a box section beam tilted forwardly slightly, as best shown in Figure 5, while beam 52 consists of a vertically disposed flat plate or bar. A box section draft tongue 53 is welded to the midpoint of beam 51 and is additionally secured thereto by a gusset plate 49. The tongue extends forwardly and downwardly from beam 51 through a notch 49' in the bottom edge of beam 52, to which it is welded. The front end of the draft tongue 53 is provided with any suitable coupling means 54 adapted for connection with the drawbar of a tractor. When the draft tongue is hitched to a tractor drawbar, a considerable portion of the weight of the spreader body and the load carried thereby is supported on the drawbar. When the tongue 53 is disconnected from the tractor, it is supported on a swinging jack stand 55 which is pivoted to the tongue at 56. The hitch frame construction described above is exceedingly rigid and adds materially to the stiffness of the body for resisting twisting when one corner of the spreader is more heavily loaded than the others.

The rear end of the spreader is supported on a pair of laterally spaced traction drive wheels 60 and 61 which also furnish the power for driving the conveying and distributing mechanism. The wheels 60, 61 are mounted upon a rear axle 62 which extends transversely across the rear portion of the body. Each of the drive wheels has a hub 63 (Figure 7) journaled on the axle 62 and formed with internal ratchet teeth 64 which are engaged during forward travel of the spreader by spring-pressed dogs 65 journaled on pins 66 fixed to flanges 70 of sleeves 71, 72. The sleeves 71, 72 are preferably secured to the axle by keys 73, 74. With the construction described, the axle 62 and the sleeves 71, 72 are driven in unison, both wheels furnishing driving power on straight-away travel, and, when a turn is being made, the power being furnished by the wheel traveling through the larger arc, the other wheel at such time being permitted to idle by reason of the ratchet mechanism above described.

The load carrying body is supported from the rear axle by brackets 75 and 76 which are secured to the under sides of the longitudinal frame members 12, 13, respectively, by bolts 79, 80 and 81. Bearing housings 82 are fixed to the brackets 75, 76, and the axle 62 turns on rollers 83 disposed within the bearing housings.

The transversely disposed torque member 16 embraces the rear axle 62 and is made of heavy gauge sheet metal or boiler plate, preferably bent into the form of a U-shaped channel member having outwardly turned flanges 84 which are riveted at 85 to the under side of the flooring 20. The laterally outer ends of the torque member 16 are welded to the inner surfaces of the bearing support flanges 75, 76, thereby forming, in effect, a closed, hollow beam wherein the flooring 20 constitutes one side of the beam. The above-described beam construction has great torsional strength and adds to the stiffness and rigidity of the spreader body.

The beating and distributing mechanism 45 consists of an upper beater 86, a lower beater 87, and a rotary widespread 88 to the rear thereof, the function of the beaters being to break up the manure as it is fed thereto by the conveyor 32, and to distribute the manure to the widespread which scatters it over the ground. The beaters 86 and 87 are mounted on suitable shafts which are journaled in bearings 90 and 91 fixed to the sides 22 of the body. The beaters are driven through the medium of a chain 93 having driving engagement with a large sprocket 94 fixed to the flange 70 of the sleeve 72, and the chain 93 is trained over sprockets fixed to the ends of the beater shafts.

The rotary widespread 88 is driven from the lower beater 87 by a chain 95 which is trained around sprockets 96 and 97 fixed to the left hand ends of the beater and drum shafts, respectively. Suitable means, not shown, is provided for interrupting the drive from the sprocket 94 to the sprocket 92, thereby stopping the operation of the beating and distributing mechanism.

As previously stated, the material within the body is moved rearwardly into the path of the beater 86 by the endless apron or conveyor 32 which is trained over sprockets on the shafts 40 and 41. The conveyor is driven by the rear shaft 41 which is slowly rotated by mechanism that will now be described.

The left hand end of the shaft 41 extends beyond the bearing 42 and has a housing 100 journaled on the outer end thereof, which is closed by a plate 99. Disposed within the housing and fixed to the shaft 41 by a key 101 is a ratchet wheel 102, the teeth of which are engaged by a pawl 103 journaled on a pin 104 fixed to the housing wall. A spring 105 presses the pawl down against the ratchet teeth, and when the housing is rotated in a clockwise direction, as viewed in Figure 10, the ratchet wheel is engaged by the pawl and caused to rotate therewith, whereas, when the housing is rotated in a counterclockwise direction, the pawl ratchets freely over the teeth.

Means is provided for oscillating the housing 100 to advance the ratchet wheel 102, as described above, and such means preferably comprises a two-lobed cam 106 which is formed integral with the flange 70 of the sleeve 71 and which rotates therewith as the spreader travels forwardly. The cam 106 engages a roller 110 which is disposed between a pair of laterally spaced ears 111, 112 on the outside of the housing, and is journaled on a bolt 113 extending through aligned holes in the ears. A spring 114 is anchored to the frame member 12 and is attached to the housing 100 so as to exert a force on the same tending to hold the roller 110 against the cam. As the cam 106 rotates with the axle, the roller 110, pressed against the cam by the spring 114, follows the contour of the cam and thereby causes the housing 100 to rock back and forth on the shaft 41. Each time the housing rocks in a clockwise direction, the pawl 103 picks up one or more teeth on the ratchet wheel.

The rate at which the material is fed to the beating and distributing mechanism by the conveyor 32 is governed by adjusting the angular distance through which the housing 100 rocks, so as to increase or decrease the number of teeth picked up by the pawl 103 during each revolution of the cam. Thus, for the minimum rate of feed, the pawl 103 would pick up only one tooth during each rocking movement of the housing, whereas for the maximum rate of feed, the pawl might pick up five or six teeth, depending on the radial distance between the highest and lowest points on the cam 106. The means for adjusting the amount of angular movement of the housing 100 preferably comprises a feed control arm 115 journaled on the shaft 41 between the bearing 42 and housing 100. The arm 115 is engageable with a limit stop 116 (Figure 10) formed on the adjacent face of the housing to limit the counterclockwise, or return, movement of the housing so that the roller 110 is prevented from following the contour of the cam to the lowest point thereof. By thus positioning the lever arm 115 so that the roller is engaged by the high portion only of the cam, it is possible to obtain any desired feed less than the maximum. When it is desired to discontinue the application of power to the feed mechanism that moves the apron, it is necessary only to shift the feed control arm 115 to a position where the roller 110 is entirely out of the path of the cam 106. An operating rod 117 is pivotally connected with the free end of the feed control arm and extends forwardly therefrom through suitable slots in the vertical frame members 31 and 23 to connect with a lever arm 120 mounted on the outer end of a transversely disposed shaft 121, which is adjustable by the operator through a hand-operated lever 144.

The ratchet wheel 102 is held against reverse movement during the counter-clockwise return movement of the housing by a lock pawl 122 having a transversely disposed shaft portion 123 journaled in a bearing boss 124 of a bracket 125 which is bolted by botls 127 to the lower end of the vertical frame member 31 and by bolt 128 to the longitudinal frame member 12. The bearing boss 124 projects laterally into the housing 100 through an arcuate slot 126 (Figures 10 and 12) in the inner side thereof, and the slot is covered by a closure plate 130 having an aperture 130' to receive the bearing boss 124. The plate 130 is curved to correspond with the curvature of the slot 126, and slidably engages the side of the housing adjacent the edges of the slot, the plate being held against the housing by a spring 131 which embraces the boss 124 and bears at one end against the plate and at the other end against the bracket 125. The plate extends on either side of the shaft 123 so as to cover the slot 126 from end to end when the housing is in either of its extreme positions. The locking pawl 122 is yieldingly held down against the ratchet wheel 102 by a spring 132 which is based on the bracket 125 and engages an arm 133 on the laterally inner end of the shaft 123.

Fixed to the side walls 22 of the load carrying body 10 adjacent the front end thereof is a downwardly and rearwardly inclined dash 134, the lower end of which terminates substantially at the front end of the flooring 20 (Figure 5). The dash extends above the top of the side walls to allow the manure to be heaped up and thereby increase the quantity of manure carried in each load. A reenforcing angle member 135 is fixed to the under side of the dash and extends down the center thereof. A generally transversely disposed hood 136 of heavy gauge sheet metal or boiler plate is fixed to the front ends of the side walls 22 upon the laterally extending flanges of the reenforcing angles 28 and is bolted to the top edge of the hitch frame cross bar 52. The hood 136 extends upwardly from the bar 52, curving rearwardly near its upper end to correspond to the curvature of the sides, and is joined to the underside of the inclined dash 134. A curved reenforcing plate 140 is fixed to the longitudinal center portion of the curved hood, and both the hood and plate have a pair of laterally spaced vertical slots 141 and 142 formed therein to pass levers 143 and 144, respectively, which are mounted on transversely extending shafts 145 and 121. The shafts 145 and 121 are disposed within the space enclosed by the inclined dash 134, hitch frame 14, and curved hood 136, and are journaled in brackets 138 and 139 fixed to the member 135, and in bearing members 148 and 149 fixed to the side walls 22 of the body. One side of slot 141 is notched at 146 to receive and lock the lever 143 in adjusted position, while slot 142 is notched at 147 to receive and lock the lever 144 in adjusted position. Preferably, the curve of the hood 136 and plate 140 is an arc about the axis of the shafts 121, 145, so that the notches of the slots 141 and 142 engage their respective levers 143, 144 at the same point in any position of adjustment. As stated previously, lever 144 controls the rate of feed of the mechanism actuating the conveyor apron 32. Shaft 145 likewise has an arm 150 mounted on the outer end thereof which is connected with an operating rod 151 having operating connection at its rear end with the mechanism (not shown) for interrupting the transmission of power from the axle 62 to the beaters 86, 87 and widespread 88.

A manure spreader constructed in the manner described above is light in weight and economical to manufacture, and at the same time has great strength and rigidity for resisting torsional forces tending to twist the body about its longitudinal axis. This rigidity results from the combination of the several structural elements, such as the hitch frame 14, curved hood 136, and torque member 16, which go to make up the complete machine.

What we claim as our invention is:

1. Drive mechanism for conveyors and the like, comprising in combination, a rotatable shaft, a support therefor, an enclosed housing journaled on said shaft, a ratchet wheel disposed within said housing and fixed to said shaft, a pawl pivoted to said housing and engageable with said ratchet wheel for advancing the same when the housing is oscillated, means for oscillating said housing, said housing having a generally circumferentially extending slot formed in one side thereof, a stop pawl pivotally mounted on said support and extending through said slot into the interior of the housing, said stop pawl engaging said ratchet wheel to prevent reverse movement thereof, and means for closing the space between said stop pawl and the edges of said slot, said means being adapted to accommodate the movement of said housing relative to said stop pawl.

2. Drive mechanism for conveyors and the like, comprising in combination, a rotatable shaft, a support therefor, an enclosed housing journaled on said shaft, a ratchet wheel disposed within said housing and fixed to said shaft, a pawl pivoted to said housing and engageable with said ratchet wheel for advancing the same when the housing is oscillated, means for oscillating said housing, a stop pawl pivotally mounted on said support at one side of said housing, said pawl extending laterally inwardly through a slot in said housing and engaging said ratchet wheel to prevent reverse movement thereof, and a closure embracing said stop pawl and slidably engaging said housing adjacent the edges of the slot for closing the slot while permitting oscillatory movement of the housing relative to the stop pawl.

3. Drive mechanism for conveyors and the like, comprising in combination, a rotatable shaft, a support therefor, an enclosed housing journaled on said shaft, a ratchet wheel disposed within said housing and fixed to said shaft, a pawl pivoted to said housing and engageable with said ratchet wheel for advancing the same when the housing is oscillated, means for oscillating said housing, a stop pawl pivotally mounted on said support at one side of said housing, said pawl extending laterally inwardly through a curved slot in said housing and engaging said ratchet wheel to prevent reverse movement thereof, said slot being arcuate about the axis of said shaft, a curved plate slidably engaging the side of said housing adjacent the edges of the slot for closing the slot, and means urging said plate against the housing.

4. Drive mechanism for conveyors and the like, comprising in combination, a rotatable shaft, a support therefor, an enclosed housing journaled on said shaft, a ratchet wheel disposed within the housing and fixed to said shaft, a pawl carried by said housing and engageable with said ratchet wheel for advancing the same when the housing is rocked, means for rocking the housing, a bracket fixed to said support adjacent one side of said housing, a lock pawl journaled on said bracket and extending inwardly through a curved slot in the housing to engage said ratchet wheel for holding the same against reverse movement, a closure plate mounted on said bracket and slidably engaging the side of said housing adjacent the edges of the slot, said plate being shaped to cover the slot, and spring means supported on the bracket and bearing against said plate to hold the same against the housing.

5. Drive mechanism for conveyors and the like, comprising in combination a ratchet wheel adapted to be operatively connected with said conveyor for driving the same, a support therefor, a rockable housing enclosing said ratchet wheel, a pawl carried by said housing and engageable with said ratchet wheel for advancing the same in one direction when the housing is rocked, a stationary pawl mounted on said support and extending through an opening in said housing, said stationary pawl engaging said ratchet wheel for holding the same against reverse movement, and a cover plate carried by said pawl and slidably engaging said housing to close said opening.

6. Drive mechanism for conveyors and the like, comprising in combination, a rotatable shaft, a support therefor, an enclosed housing journaled on said shaft, a ratchet wheel disposed within the housing and fixed to said shaft, a pawl carried by said housing and engageable with said ratchet wheel for advancing the same when the housing is rocked, means for rocking the housing, a bracket fixed to said support adjacent one side of said housing, a bearing sleeve mounted on said bracket and extending through a slot in said housing, said slot providing for rocking the housing relative to said sleeve, a closure plate closely embracing said sleeve and disposed in sliding engagement with said housing to cover the slot in various positions of said housing, and a lock pawl attached to said support and extending through said sleeve to engage said ratchet wheel for holding the same against reverse movement.

7. Drive mechanism for conveyors and the like, comprising in combination, a rotatable shaft, a support therefor, an enclosed housing journaled on said shaft, a ratchet wheel disposed within the housing and fixed to said shaft, a pawl carried by said housing and engageable with said ratchet wheel for advancing the same when the housing is rocked, means for rocking the housing, a bracket fixed to said support adjacent one side of said housing, said housing having a circumferentially extending slot in one side wall thereof, a bearing sleeve fixedly mounted on said bracket and extending through said slot into said housing, said slot providing for rocking the housing relative to said sleeve, a closure plate for said slot disposed in sliding engagement with said side wall and having an opening through which said sleeve extends, said plate extending in both directions from said sleeve to cover said slot in any rocked position of said housing, a coil spring encircling said sleeve between said bracket and said closure plate to hold the latter against said housing wall, and a lock pawl disposed within said housing adapted to engage said ratchet wheel to hold the latter against reverse movement and having a supporting shaft journaled in said sleeve.

LEONARD B. NEIGHBOUR.
FREDERICK A. THOMANN.